United States Patent
Nagura (10) Patent No.: US 9,127,967 B2
(45) Date of Patent: Sep. 8, 2015

(54) ENCODER HAVING PLURAL PHASE ACQUIRERS AND A POSITIONAL INFORMATION ACQUIRER FOR PRECISELY OBTAINING A POSITION OF A SCALE

(75) Inventor: Chihiro Nagura, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 264 days.

(21) Appl. No.: 13/446,057

(22) Filed: Apr. 13, 2012

(65) Prior Publication Data

US 2012/0262731 A1    Oct. 18, 2012

(30) Foreign Application Priority Data

Apr. 14, 2011    (JP) .................. 2011-089745

(51) Int. Cl.
*G01D 5/34* (2006.01)
*G01D 5/347* (2006.01)

(52) U.S. Cl.
CPC ........ *G01D 5/34715* (2013.01); *G01D 5/34746* (2013.01)

(58) Field of Classification Search
CPC . G01B 11/26; G01D 5/34792; G01D 5/3473; G01D 5/34707; G01D 5/34746
USPC ...... 250/231.13, 231.16, 231.18, 214 R, 221; 341/9, 13
See application file for complete search history.

(56) References Cited

U.S. PATENT DOCUMENTS

| | | | |
|---|---|---|---|
| 4,291,976 A | 9/1981 | McMahon | |
| 5,069,547 A | 12/1991 | Huggins et al. | |
| 5,699,058 A | 12/1997 | Yanagisawa et al. | |
| 5,889,280 A | 3/1999 | Matsuura | |
| 6,707,029 B1 | 3/2004 | Fuwa | |
| 6,765,195 B1 | 7/2004 | Leviton | |
| 8,188,420 B2 * | 5/2012 | Lee ........................... | 250/231.13 |
| 8,309,906 B2 * | 11/2012 | Kapner et al. ........... | 250/231.16 |

(Continued)

FOREIGN PATENT DOCUMENTS

DE    102007025238 A1    12/2007
EP    2093543 A2    8/2009

(Continued)

OTHER PUBLICATIONS

European Extended Search Report issued in application No. EP12163894.4, dated Jul. 23, 2014. Cited in related U.S. Appl. No. 13/446,587.

(Continued)

*Primary Examiner* — Que T Le
(74) *Attorney, Agent, or Firm* — Rossi, Kimms & McDowell LLP (57) ABSTRACT

An encoder includes a scale, a detector array that includes a plurality of detectors, and a signal processor configured to process and convert into positional information, an output signal from the detector array. The signal processor includes a first phase acquirer, a second phase acquirer, and a positional information acquirer configured to acquire Sv as a position signal that represents a position of the scale. Sv satisfies Sv=A·Φ1−B·Φ2 where A and B are coefficients that satisfy A/B=n/m using integers m and n that satisfy |(m·P1−n·P2)|<|(P1−P2)|. Φ1 is a first phase acquired by the first phase acquirer, Φ2 is a second phase acquired by the second phase acquirer, P1 is the first modulation period, and P2 is the second modulation period.

9 Claims, 8 Drawing Sheets

(56) References Cited

U.S. PATENT DOCUMENTS

| | | |
|---|---|---|
| 2001/0011699 A1 | 8/2001 | Aoki |
| 2002/0014581 A1 | 2/2002 | Yamamoto et al. |
| 2007/0278392 A1 | 12/2007 | Toh et al. |
| 2011/0266424 A1 | 11/2011 | Kawatoko et al. |
| 2011/0304482 A1 | 12/2011 | Kapner et al. |
| 2012/0261561 A1 | 10/2012 | Horiguchi et al. |
| 2012/0261562 A1 | 10/2012 | Nagura |
| 2012/0265484 A1 | 10/2012 | Nagura |

FOREIGN PATENT DOCUMENTS

| | | |
|---|---|---|
| EP | 2511669 A2 | 10/2012 |
| JP | 55030603 A | 3/1980 |
| JP | 63063917 A | 3/1988 |
| JP | 63065316 A | 3/1988 |
| JP | 09-196705 A | 7/1997 |
| JP | 2007-248359 A | 9/2007 |
| JP | 2009-198318 A | 9/2009 |

OTHER PUBLICATIONS

European Extended Search Report issued in application No. EP12163898.5, dated Jul. 23, 2014. Cited in related U.S. Appl. No. 13/444,934.

European Extended Search Report issued in European counterpart application No. EP12163893.6, dated Jul. 23, 2014.

European Extended Search Report issued in application No. EP12163899.3, dated Jul. 23, 2014. Cited in related U.S. Appl. No. 13/446,153.

Official Action issued in JP2011-089728, mailed Feb. 3, 2015.
Official Action issued in JP2011-089795, mailed Feb. 3, 2015.
Official Action issued in JP2011-089745, mailed Jan. 20, 2015.

* cited by examiner

ENCODER HAVING PLURAL PHASE ACQUIRERS AND A POSITIONAL INFORMATION ACQUIRER FOR PRECISELY OBTAINING A POSITION OF A SCALE

BACKGROUND OF THE INVENTION

1. Field of the Invention

The present invention relates to an encoder.

2. Description of the Related Art

In order to improve the detecting precision of an absolute encoder like an incremental encoder, Japanese Patent Laid-Open No. ("JP") 2009-198318 forms such an incremental pattern on each track on a scale that a shape or pitch of the pattern periodically changes at a modulation period in a length measuring direction. Thereby, the incremental pattern has not only information of a relative position but also modulation information of an absolute position using a repetitive modulation period. As a result, the absolute position of the scale can be highly precisely detected using information of a highly precise relative position and the less reliable, absolute position information.

JP 2009-198318 provides an incremental signal detecting photodiode array (INC array) and a modulated signal detecting photodiode array (modulation array) as light receiving elements each configured to receive light from the scale. A length of the INC array in the distance measuring direction is made an integer times as large as the modulation length, and a relative position signal representative of a relative position is generated on the basis of an output from the INC array. A modulation pattern position signal is generated on the basis of an output from the modulation array, and used for an absolute position signal.

However, JP 2009-198318 obtains a signal of a different period from an incremental pattern provided on each track, and a pattern detectable range is restricted by the length of the INC array in the length measuring direction.

SUMMARY OF THE INVENTION

The present invention provides an encoder that can precisely obtain an absolute position signal in a wide range without increasing its size.

An encoder according to the present invention includes a scale that includes a pattern row that has a plurality of patterns configured to spatially modulate an energy distribution, a detector array that includes a plurality of detectors that are configured to detect the energy distribution from the pattern row and arranged in a moving direction, the detector array being configured to move relatively to the scale, and a signal processor configured to process and convert into positional information, an output signal from the detector array. The pattern row has a first modulation period and a second modulation period different from the first modulation period in the moving direction. The signal processor includes a first phase acquirer configured to acquire a first phase of the first modulation period based on the output signal of the detector array, a second phase acquirer configured to acquire a second phase of the second modulation period based on the output signal from the detector array, and a positional information acquirer configured to acquire Sv as a position signal that represents a position of the scale. Sv satisfies $Sv = A \cdot \Phi_1 - B \cdot \Phi_2$ where A and B are coefficients that satisfy $A/B = n/m$ using integers m and n that satisfy $|(m \cdot P_1 - n \cdot P_2)| < |(P_1 - P_2)|$, where $\Phi_1$ is a first phase acquired by the first phase acquirer, $\Phi_2$ is the second phase acquired by the second phase acquirer, $P_1$ is the first modulation period, and $P_2$ is the second modulation period.

Further features of the present invention will become apparent from the following description of exemplary embodiments with reference to the attached drawings.

DESCRIPTION OF THE EMBODIMENTS

Figure 1:
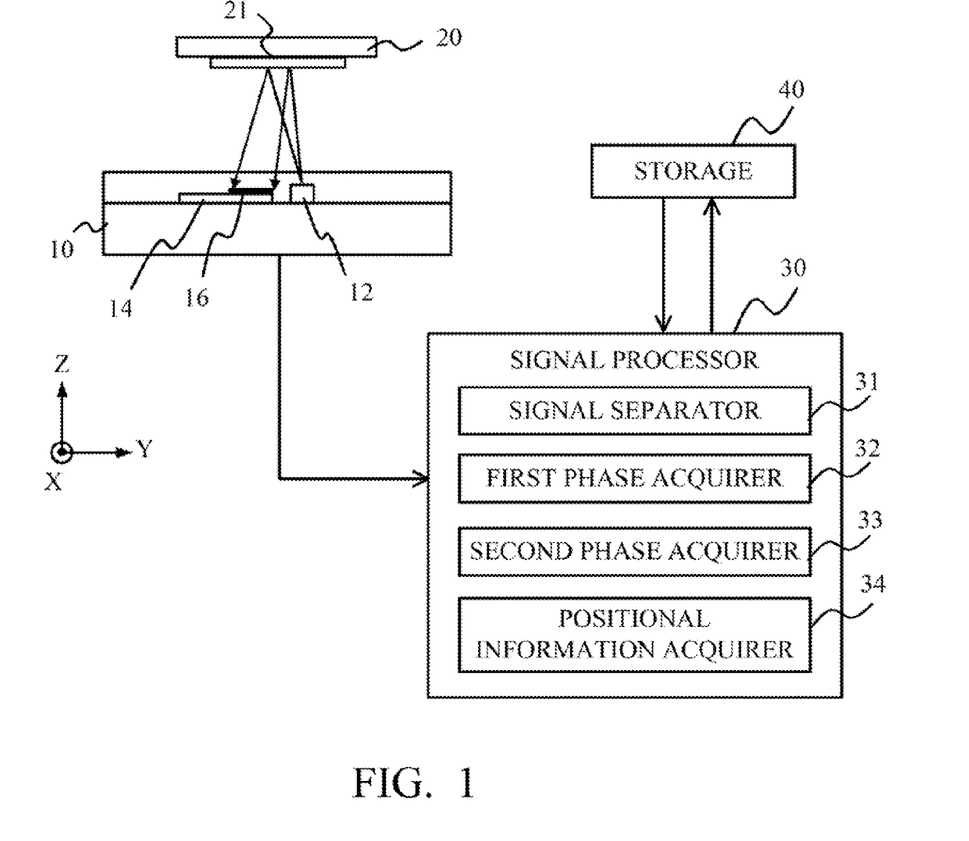
FIG. 1 is a block diagram of an encoder according to first, second and third embodiments.

FIG. 1 is a block diagram of an optical encoder according to this embodiment. The encoder includes a sensor unit 10 attached to a fixed unit, a scale 20 attached to a movable unit (not illustrated), a signal processor 30, and a storage 40. The relationship between the fixed unit and the movable unit may be reversed, as long as the sensor unit 10 and the scale 20 are configured to move relatively to each other.

The sensor unit 10 is an integrated sensor unit of a light receiving unit and a light emitting unit, and includes a light source 12 including a light emitting diode ("LED") and a light receiving IC 14 including a light receiving element array 16 in the same package. The light receiving element array 16 serves as a detector array that includes a plurality of detectors configured to detect the energy distribution from the pattern of the scale 20 and arranged in an X direction as a moving direction (or a length measuring direction) of the scale 20 (or the movable unit). The energy is light in this embodiment, but as described later, the energy type is not limited to the light and may be include magnetism and electricity.

The scale 20 has a track 21, which is patterned as a pattern row. The pattern row has a plurality of patterns made of a chromium reflective film on a glass substrate. The pattern is used to spatially modulate the energy distribution.

Each track 21 includes a plurality of areas, which are periodically arranged in a Y direction perpendicular to the X direction and have different pitches (modulation periods) in the X direction. A "pitch" (modulation period), as used herein, means a space period of the patterns formed in a track in the X direction. The pitch (modulation period) is a reciprocal of a spatial frequency (or a value proportioned to the reciprocal). For example, when there are two types of areas, a first area has a first pitch (first modulation period) in the X direction, and a second area has a second pitch (second modulation period) in the X direction.

An area of the first modulation period is not necessarily separated from an area of the second modulation period, and both areas may overlap each other.

The light receiving element array 16 in this embodiment receives light reflected on the pattern of the scale 20, but this embodiment is applicable to the light receiving element array 16 configured to receive transmitted light through the pattern of the scale 20. In other words, it is sufficient that the light receiving element array 16 receives the light from the pattern of the scale 20.

The signal processor 30 processes an output signal of the light receiving element array 16 in the sensor unit 10, and converts it into positional information. The signal processor 30 also performs interpolation processing to an encoder signal obtained by the sensor unit 10, and writing and reading of the signal for the storage 40.

The signal processor 30 includes a noise filter (not illustrated), an amplifier (not illustrated), an A/D converter (not illustrated), a signal separator 31, a first phase acquirer 32, a second phase acquirer 33, and a positional information acquirer 34. Depending upon embodiments, the second phase acquirer 33 may be omitted.

The signal separator 31 serves to separate an output from the light receiving element array 16 into a signal corresponding to each area of the track 21. The signal separator 31 sends a signal used to switch a connection of a switching circuit, if any, in the light receiving IC 14, or separates the signal using a fast Fourier transform ("FFT") when the light receiving IC 14 has no switching circuit. Alternatively, the signal separator 31 may separate the signal by providing light receiving elements having different light receiving surfaces for each pattern pitch of the light receiving element array 16.

The first phase acquirer 32 acquires a (first) phase of the energy distribution of the first area by performing an arc tangent operation for an output (digital) signal from the light receiving element array 16A (corresponding to the first area). The first phase acquirer 32 may serve as a relative position signal acquirer, which will be described later. The "relative position," as used herein, means a variation amount of the position or a variation direction or amount of the position per unit time or per sampling period (used to obtain the position signal). Alternatively, the relative position may be a variation direction or amount of the position at reference time (when the power is turned on or at predetermined reference timing).

The second phase acquirer 33 acquires a (second) phase of the energy distribution of the second area by performing an arc tangent operation for an output (digital) signal from the light receiving element array 16A (corresponding to the second area).

When the track 21 contains an area having a pattern row with a third pitch, a third phase acquirer etc. may be provided accordingly.

The positional information acquirer 34 acquires positional information of the scale 20. The positional information acquirer 34 may include a relative position information acquirer configured to acquire a relative position signal representative of a relative position of the scale 20 and an absolute position information acquirer configured to acquire an absolute position signal representative of an absolute position of the scale 20. The "absolute position," as used herein, means a position of a driver to an apparatus that includes the driver, and is different from a variation amount of the position to the position at the predetermined reference timing. Once the absolute position) is determined, the position of the driver to the apparatus is uniquely determined. In the apparatus to which the encoder of this embodiment is attached, a scale is arranged onto one of the driver and the fixed or movable unit that does not move with the driver, and a detector array is arranged onto the other. Thereby, the position of the driver having the scale relative to the fixed unit (apparatus body side) having the detector array becomes detectable.

In operation, a divergent light flux emitted from the light source 12 in the sensor unit 10 is irradiated onto the track 21 of the scale 20, and the light flux reflected on the track 21 is, received by the light receiving element array 16 in the sensor unit 10. The light receiving element array 16 receives an image in which a reflective index distribution of the track 21 is magnified twice. The light flux received by the light receiving element array 16 is converted into an electric signal, and sent as an encoder signal to the signal processor 30. The signal processor 30 converts the output from the light receiving element array 16 into positional information, and precisely obtains and outputs the information of the position of the scale 20.

First Embodiment

Figure 2:
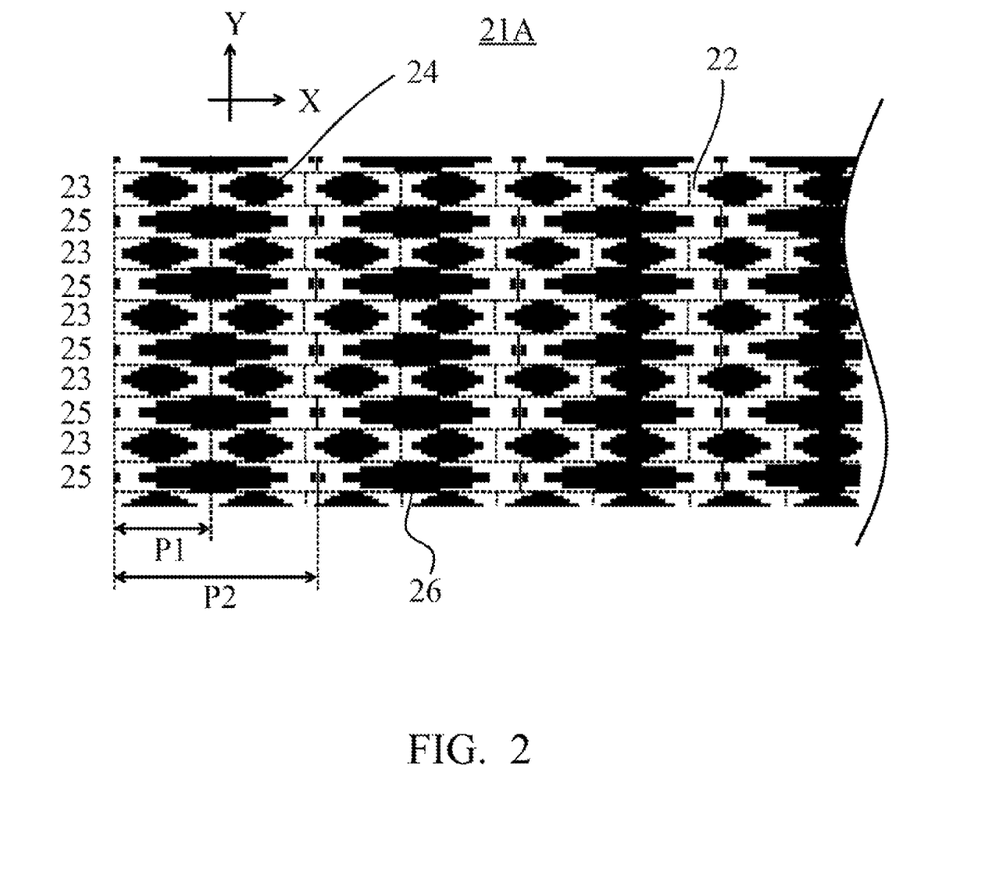
FIG. 2 is a partially enlarged plane view of a track according to the first embodiment.

FIG. 2 is a partially enlarged plane view of the track 21A according to the first embodiment applicable to the track 21 illustrated in FIG. 1. In the track 21A, two types of areas (23 and 25) alternate in the Y direction perpendicular to the moving direction (X direction) of the scale 20, and one track is set to a range that contains the overall width illustrated in FIG. 2 (that can be scanned on the light receiving surface of the light receiving array 16A). The area 23 corresponds to the above first area, and the area 25 corresponds to the above second area. In FIG. 2, a white portion is a non-reflector 22 configured to transmit or absorb the light.

Figure 3:
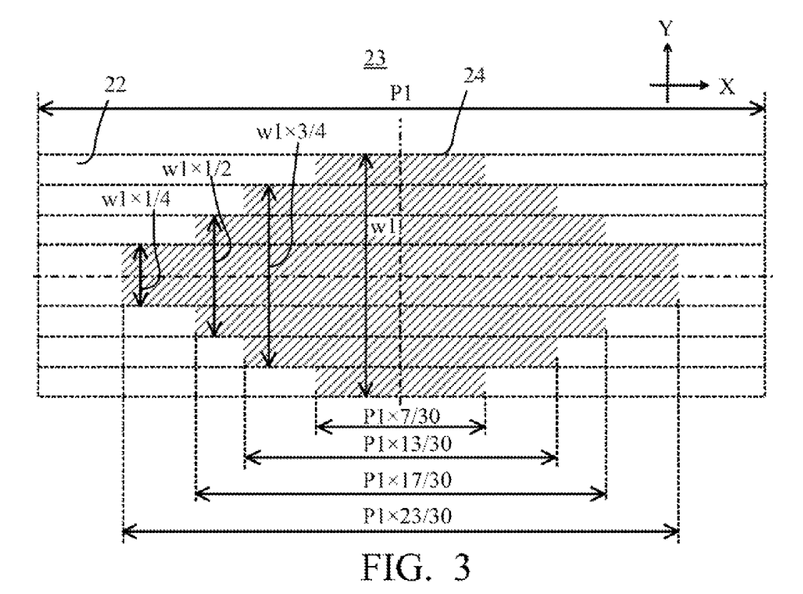
FIG. 3 is a partially enlarged plane view of FIG. 2 according to the first embodiment.

FIG. 3 is an enlarged plane view of the area 23 for one period in the X direction. The area 23 includes a pattern row in which the pattern illustrated in FIG. 3 is arranged every (first) pitch P1 (=100 μm) in the X direction. Each pattern includes the non-reflector 22, and a reflector 24 made of a reflective film and configured to reflect light. The pitch P1 serves as the above first modulation period. A width of the area 23 in the Y direction is set to W1=50 μm.

A width of the reflector 24 in the X direction is different with a position of the area 23 in the Y direction. In an area distant by a distance of w1·1/8 or less from the center in the Y direction, the width of the reflector 24 is P1·23/30 in the X direction. In an area distant by a distance of w1·1/8 to w1·1/4 from the center in the Y direction, the width of the reflector 24 is P1·17/30 in the X direction. In an area distant by a distance of w1·1/4 to w1·3/8 from the center in the Y direction, the width of the reflector 24 is P1·13/30 in the X direction. In an area distant by a distance of w1·3/8 to w1·1/2 from the center in the Y direction, the width of the reflector 24 is P1·7/30 in the X direction.

Figure 4:
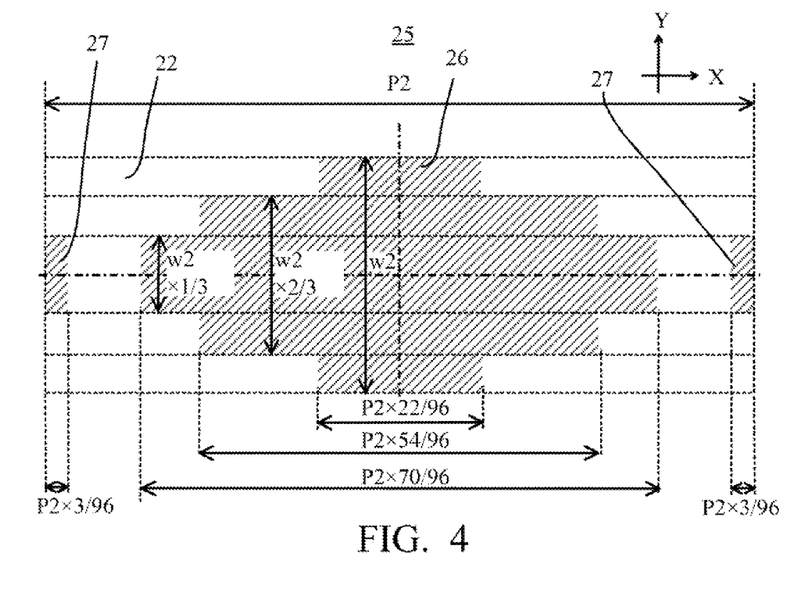
FIG. 4 is a partially enlarged plane view of FIG. 2 according to the first embodiment.

FIG. 4 is an enlarged plane view of the area for one period in the X direction. The area 25 includes a pattern row in which the pattern illustrated in FIG. 4 is arranged every (second) pitch P2 (=202 μm) in the X direction. Each pattern includes a non-reflector 22 and reflectors 26, 27 each made of a reflective film and configured to reflect light. The pitch P2 serves as the above second modulation period. A width of the area 25 in the Y direction is set to W2=50 μm.

A width of each of the reflector 26 in the X direction is different with a position of the area 25 in the Y direction. In an area distant by a distance of w2·1/6 or less from the center in the Y direction, the width of the reflector 26 is P2·70/96 in the X direction. The reflector 27 is formed with a width of P2·3/96 from each of both ends of the period. In an area distant by a distance of w2·1/6 to w2·1/3 from the center in the Y direction, the width of the reflector 26 is P2·54/96 in the X direction. In an area distant by a distance of w2·1/3 to w2·1/2 from the center in the Y direction, the width of the reflector 26 is P2·22/96 in the X direction.

Figure 5A:
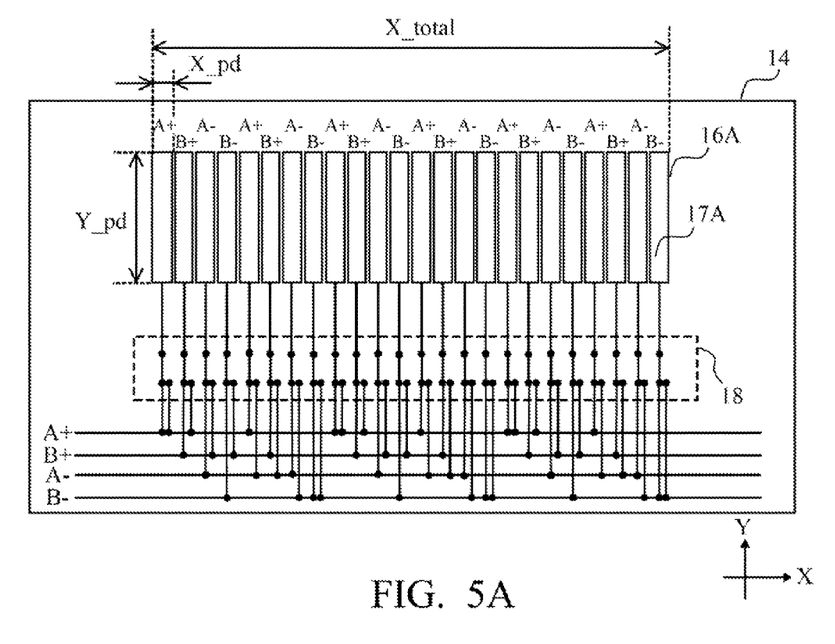
FIGS. 5A and 5B are plane views of a light receiving surface of a light receiving element array illustrated in FIG. 1 according to the first embodiment.
Figure 5B:
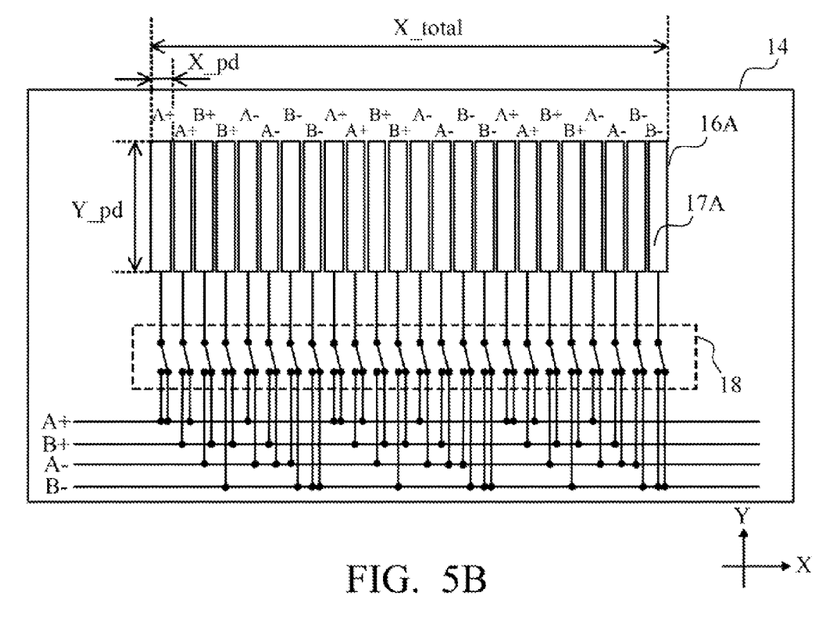

FIGS. 5A and 5B are plane views of the light receiving surface of the light receiving element array 16A according to the first embodiment applicable to the light receiving element array 16 illustrated in FIG. 1. In the light receiving element array 16A, forty-eight light receiving elements 17A are arranged with a pitch of 50 µm in the X direction: One light receiving element 17A has a width X_pd of 50 µm in the X direction, and a width Y_pd of 800 µm in the Y direction. An overall width X_total of the light receiving element array 16A is 1,200 µm.

Since the projected pattern on the scale is magnified twice, the detectable range on the scale is 400 µm in the Y direction and 600 µm in the X direction. Hence, the detectable range on the scale contains four lines in the Y direction, and each line includes, in the position detecting direction, the area 23 with a pitch of 100 µm and the area 25 with a pitch of 202 µm.

An output from each light receiving element 17A is switched by a switching circuit 18, and selectively connected to the four subsequent preamplifiers (not illustrated). Corresponding light receiving elements 17A are connected to output terminals A+, B+, A−, and B− (representative of A+ phase, B+ phase A− phase and B− phase) of four preamplifiers, and the switching circuit 18 is configured to output four-phase sign wave outputs S(A+), S(B+), S(A−), and S(B−).

The switching circuit 18 can switch a connection between the light receiving element 17A and the output terminal on the basis of the input from the signal separator 31 in the signal processor 30. As a result, an electrically added interval is switched in the plurality of light receiving elements 17A.

When the input from the signal processing circuit 30 has a high level, the electrically connected light receiving elements 17A has a central interval of 200 µm and can detect the area 23 (P1=100 µm), as illustrated in FIG. 5A.

When the input from the signal processing circuit 30 has a low level, electrically connected light receiving elements 17A has a central interval of 400 µm and can detect the area 25 (P2=202 µm), as illustrated in FIG. 5B.

With respect to the detecting pitch, relative phases of the four-phase sine wave signals have the following relationship with S(A+) as a reference: S(B+) shifts by about +90°, S(A−) shifts by about +180° and S(B−) shifts by about +270°.

The signal processor 30 generates two-phase sine wave signals S(A) and S(B) in which a DC component is eliminated, by performing the following operations for the four-phase sine wave outputs S(A+), S(B+), S(A−), and S(B−):

$$S(A)=S(A+)-S(A-) \qquad \text{Expression 1}$$

$$S(B)=S(B+)-S(B-) \qquad \text{Expression 2}$$

Herein, a correction of a signal obtained from the area 25 will be described. Since the detecting pitch (of 200 µm) of the light receiving element 17A slightly differs from the patterned period (of 202 µm) of the scale, a relative phase difference may be corrected between the two-phase sine wave signals S(A) and S(B). A description will now be given of a method of correcting a phase difference.

Initially, the two-phase sine wave signals S(A) and S(B) including the relative phase difference error "e" can be expressed with a phase of θ as follows:

$$S(A)=\cos(\theta+e/2) \qquad \text{Expression 3}$$

$$S(B)=\sin(\theta-e/2) \qquad \text{Expression 4}$$

Using Expressions 3 and 4, an error component "e" can be separated by an addition and a subtraction between the two-phase sine wave signals S(A) and S(B) as follows:

$$S(A)+S(B)=2\cdot\cos(\theta-\pi/4)\sin(e/2-\pi/4) \qquad \text{Expression 5}$$

$$-S(A)+S(B)=2\cdot\sin(\theta-\pi/4)\cos(e/2-\pi/4) \qquad \text{Expression 6}$$

The relative phase difference error "e" can be expressed as e=(1−200/202)·π using the set values. By multiplying both sides of Expression 5 by the reciprocal of 2·sin(e(x)/2−π/4) and by multiplying both sides of Expression 6 by the reciprocal of 2·cos(e(x)/2−π/4) two-phase sine wave signals S(A)' and S(B)' are calculated as follows in which the phase difference error is corrected where φ=θ−π/4:

$$S(A)'=(S(A)+S(B))/(2\cdot\sin(e/2-\pi/4))=\cos\phi \qquad \text{Expression 7}$$

$$S(B)'=(-S(A)+S(B))/(2\cdot\cos(e/2-\pi/4))=\sin\phi \qquad \text{Expression 8}$$

The relative phase difference error "e" may be stored through the initialization. For example, the amplitude component 2·sin(e(x)/2−π/4) is obtained from (maximum value−minimum value)/2 of S(A)+S(B) in the predetermined range in the X direction, and the amplitude component 2·cos(e(x)/2−π/4) is obtained from (maximum value−minimum value)/2 of −S(A)+S(B) in the predetermined range in the X direction. These values may be stored in the storage 40. In this case, it is possible to correct mounting height shifts between the light source 12 and the light receiving element array 16A and the relative inclination between the scale 20 and the sensor.

Thus obtained S(A)' is set to S(A) and S(B)' is set to S(B).

The first phase acquirer 32 in the signal processor 30 acquires a phase (signal) Φ1 of the energy distribution for the area 23 using the following operation and S(A) and S(B) when the input to the switching circuit 18 has a high level. ATAN2[Y, X] is an arc tangent function that determines a quadrant and converts it into a phase between 0 and 2π.

$$\Phi1=\text{ATAN2}[S(A),S(B)] \qquad \text{Expression 9}$$

Similarly, the second phase acquirer 33 in the signal processor 30 acquires a phase (signal) Φ2 of the energy distribution for the area 25 using the following operation and S(A) and S(B) when the input to the switching circuit 18 has a low level.

$$\Phi2=\text{ATAN2}[S(A),S(B)] \qquad \text{Expression 10}$$

The position signal acquirer of this embodiment acquires the output of the first phase acquirer 32 as the relative position signal. Information of which period the scale 20 is located at from the measurement starting position when the period is predetermined can be obtained, by counting a change of the relative position signal.

The position signal acquirer of this embodiment generates a Vernier signal, which will be described later, based on the outputs of the first phase acquirer 32 and the second phase acquirer 33, and outputs information of the absolute position of the scale 20.

Signals Φ1 and Φ2 can be obtained at almost the same position without a time difference before and after switching of the input into the switching circuit 18.

In this embodiment, as illustrated in FIGS. 5A-5B, at least part of a plurality of light receiving elements 17A in the light receiving element array 16A are commonly used as the light receiving element 17A to obtain the phase signal Φ1 and the light receiving element 17A to obtain the phase signal Φ2. Hence, the light receiving element array can be made smaller than the conventional structure that separately includes the light receiving element 17A used to obtain the phase signal Φ1 and the light receiving element 17A used to obtain the phase signal Φ2.

The synchronism may deteriorate when the scale 20 quickly moves, but can be maintained by obtaining a plurality of phases and by averaging the phases. Initially, S(A+), S(A−), S(B+) and S(B−) are obtained with a detecting pitch of 100 μm, and the level of the input into the switching circuit 18 is switched from the high level to the low level. Next, S(A+), S(A−), S(B+) and S(B−) are obtained with a detecting pitch of 200 μm, the level of the input into the switching circuit 18 is switched from the low level to the high level, and S(A+), S(A−), S(B+) and S(B−) are again obtained with a detecting pitch of 100 μm. An interval of the acquisition timing is maintained approximately constant. The synchronism between Φ1 and Φ2 can be improved by averaging the first Φ1 and the second Φ1 obtained through the above operations.

Next, the positional information acquirer 34 in the signal processor 30 acquires the Vernier signal Sv that serves as the absolute position signal as follows:

$$Sv = \Phi 1 - 2 \cdot \Phi 2 \qquad \text{Expression 11}$$

At this time, the signal processor 30 repeats Sv=Sv+2π when Sv<0 and Sv=Sv−2π when Sv>2π and converts Sv into an output range between 0 and 2π. The relationship between the phase signal Φ1 and the position x in the X direction and the relationship between the phase signal Φ2 and the position x in the X direction are expressed as follows:

$$\Phi 1 = 2\pi x/P1 \qquad \text{Expression 12}$$

$$\Phi 2 = 2\pi \cdot x/P2 \qquad \text{Expression 13}$$

The period Tv of the Vernier signal Sv is a phase variance amount of Φ1−2·Φ2 from 0 to ±2π in the X direction, and thus Sv can be expressed as follows:

$$\Phi 1 - 2 \cdot \Phi 2 = 2\pi \cdot Tv/P1 - 2\pi 2\pi \cdot Tv/P2 = \pm 2\pi \qquad \text{Expression 14}$$

$$Tv = |P1 \cdot P2/(2 \cdot P1 - P2)| \qquad \text{Expression 15}$$

Figure 6A:
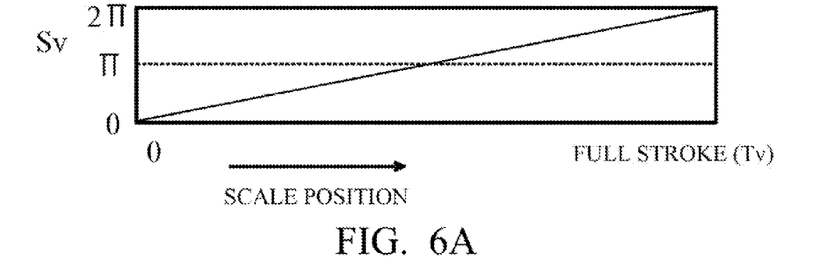
FIGS. 6A and 6B illustrate a relationship between a detected signal and a scale position according to the first embodiment.

FIG. 6A illustrates a relationship between the thus obtained Vernier signal Sv and the scale position. In this embodiment, the period Tv of the Vernier signal Sv becomes 10.1 mm from Expression 15, and this is a detectable range. Since the detectable range on the scale in the light receiving element array length is a range of 600 μm in the X direction, the detectable range is much longer than a detectable range of the light receiving element array length. Thus, by using the Vernier signal as an absolute position signal, the absolute position of the scale in the moving direction can be detected in a wide range.

Figure 6B:
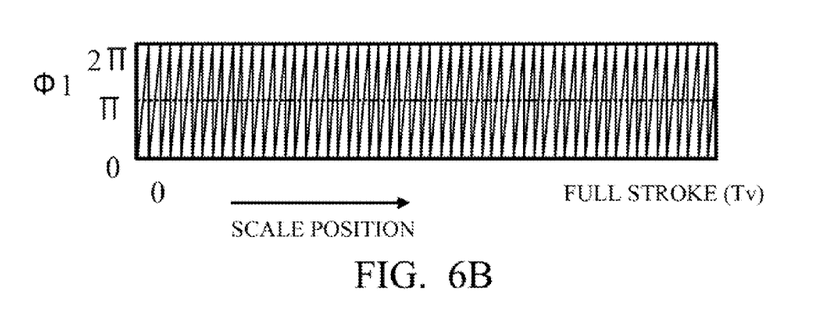

FIG. 6B illustrates a relationship between the phase output Φ1 and the scale position before the arc tangent calculation is performed. The phase output Φ1 is used for the relative position signal (incremental signal) representative of the relative position of the scale 20. For more detailed description of the effect of this embodiment, a more generalized principle will be described below. When the Vernier signal Sv is generated without multiplying each of the phases Φ1 and Φ2 by a coefficient, the phases Φ1 and Φ2 can be expressed as in Expressions 12 and 13 and the Vernier signal can be expressed as follows:

$$Sv = \Phi 1 - \Phi 2 \qquad \text{Expression 16}$$

Since the period Tv of the Vernier signal Sv is a variation amount of a position in the X direction when the Vernier signal Sv changes from 0 to ±2π, the following expression is established:

$$Sv = \Phi 1 - \Phi 2 = 2\pi \cdot Tv/P1 - 2\pi \cdot Tv/P2 = \pm 2\pi \qquad \text{Expression 17}$$

Therefore, the moving range detectable by or the period of the Vernier signal can be expressed as follows:

$$Tv = |P1 \cdot P2/(P1 - P2)| \qquad \text{Expression 18}$$

A description will now be given of a condition used to separate the phases Φ1 and Φ2. The spatial frequency resolution Δf by the detecting width Wpd on the scale is expressed as 1/Wpd, and the condition used to separate two periodic components P1 and P2 on the scale is expressed as follows:

$$\Delta f = 1/Wpd < |(1/P1 - 1/P2)| \qquad \text{Expression 19}$$

Therefore, the following expression is established:

$$Wpd > |P1 \cdot P2/(P1 - P2)| \qquad \text{Expression 20}$$

When Expressions 18 and 20 are compared with each other, the following expression is established:

$$Wpd > |P1 \cdot P2/(P1 - P2)| = Tv \qquad \text{Expression 21}$$

In other words, the moving range detectable by the Vernier signal cannot exceed the detecting width Wpd on the scale when the subtraction is performed without multiplying Φ1 and Φ2 by the coefficients. On the other hand, the moving range detectable by the Vernier signal can be made equal to or larger than Wpd by multiplying each of Φ1 and Φ2 by a different coefficient. A detailed description thereof will be given below.

$$Sv = n \cdot \Phi 1 - m \cdot \Phi 2 \qquad \text{Expression 22}$$

Since Φ1 and Φ2 are phase components of the periodic function, there is a return of 2π to 0. When an output range is converted by Sv' (0≤Sv'<2π) that is expressed as Sv'=Sv±2πl ("l" is an integer) using the Vernier signal Sv, both of n and m need to be integers in order to maintain the continuity at the return point.

Returns of n·Φ1 and m·Φ2 are 2π·n and 2π·m. If n and m are integers, the continuity is maintained because the subtracted result or a difference before and after the return points becomes integer times as large as 2π.

Nevertheless, the coefficients of Sv are not limited to integers m and n. Expression 22 can be expressed as follows where A and B are coefficients that satisfy A/B=n/m:

$$Sv = A \cdot \Phi 1 - B \cdot \Phi 2 \qquad \text{Expression 23}$$

When an output range is converted by Sv' (0≤Sv'<c) that is expressed as Sv'=Sv±c·l ("l" is an integer) using the Vernier signal Sv, c, m and n may be set so that both of 2π·m/c and 2π·n/c can be integers.

The period Tv of the Vernier signal Sv can be expressed as follows when m and n are integers:

$$Tv = |P1 \cdot P2/(m \cdot P1 - n \cdot P2)| \qquad \text{Expression 24}$$

The condition in which the period Tv of the Vernier signal is wider than the detecting range Wpd is expressed as follows based on Expressions 20 and 24:

$$|P1 \cdot P2/(m \cdot P1 - n \cdot P2)| > |P1 P2/(P1 - P2)| \qquad \text{Expression 25}$$

When the following expression is satisfied, the period Tv of the detectable range becomes wider than the detecting width Wpd:

$$|(m \cdot P1 - n \cdot P2)| < |(P1 - P2)| \qquad \text{Expression 26}$$

As discussed above, when m, n, P1 and P2 are properly set (for example, when P1 is approximated to (n/m)·P2), the detectable range becomes much wider than the detecting width Wpd.

Herein, m and n may be selected from small integers, because the phase difference errors contained in Φ1 and Φ2 are n times and m times in the Vernier signal Sv. One proper combination of n and m is 1 and 2.

While this embodiment illustrates an optical encoder, a magnetic encoder and an electrostatic encoder can also exhibit similar effects. In case of the magnetic encoder, a magnetic material is utilized for the scale 20, and a magnetic polarity distribution is formed with a shape similar to the reflective film of the scale 20 of this embodiment. A magnetic field detector array is arranged closely to this scale for detections. In the electrostatic type, a conductive electrode pattern is formed in a shape similar to the scale reflective film of this embodiment, and another electrode pattern array is closely opposed for detections.

Thus, an absolute position signal can be precisely obtained or detected in a wide range without increasing the size of the sensor.

Second Embodiment

Figure 7:
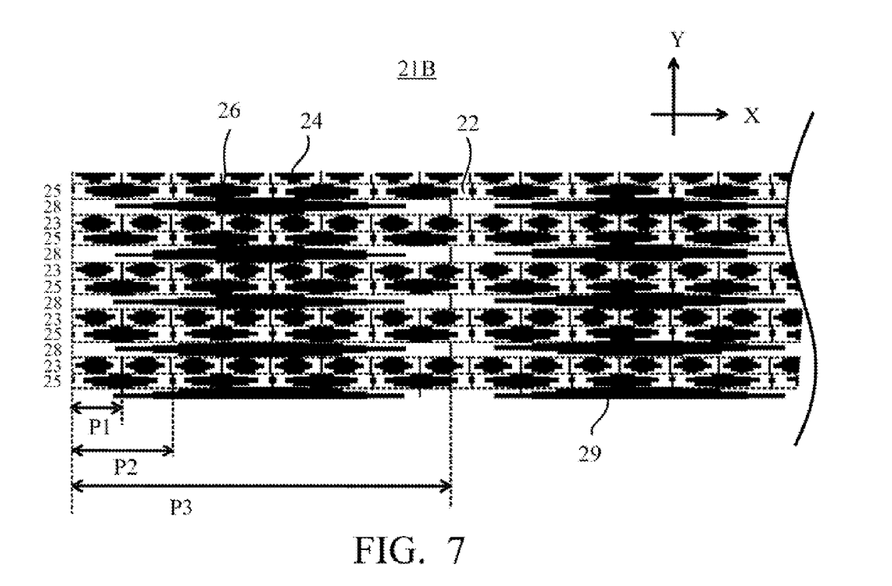
FIG. 7 is a partially enlarged plane view of a track according to the second embodiment.

The basic structure of the encoder illustrated in FIG. 1 is applicable to this embodiment. FIG. 7 is a partially enlarged plane view of a track 21B according to a second embodiment applicable to the track 21 illustrated in FIG. 1.

In the track 21B, three types of areas (23, 25, and 28) alternate in the Y direction perpendicular to the moving direction (X direction) of the scale 20, and one track is set to a range that contains the overall width illustrated in FIG. 7 (that can be scanned on the light receiving surface of the light receiving array 16B).

The area 23 includes a pattern row in which a pattern illustrated in FIG. 3 is arranged every pitch P1 in the X direction (which is 99.50249 μm). The width W1 of the area 23 is 50 μm in the Y direction. Similar to the first embodiment, a width of the reflector 24 in the X direction differs according to a position of the area 23 in the Y direction.

The area 25 includes a pattern row in which the pattern illustrated in FIG. 4 is arranged every pitch P2 (=200 μm) in the X direction. A width W2 of the area 25 is 50 μm in the Y direction. Similar to the first embodiment, a width of the reflector 26 in the X direction differs according to a position of the area 25 in the Y direction.

Figure 8:
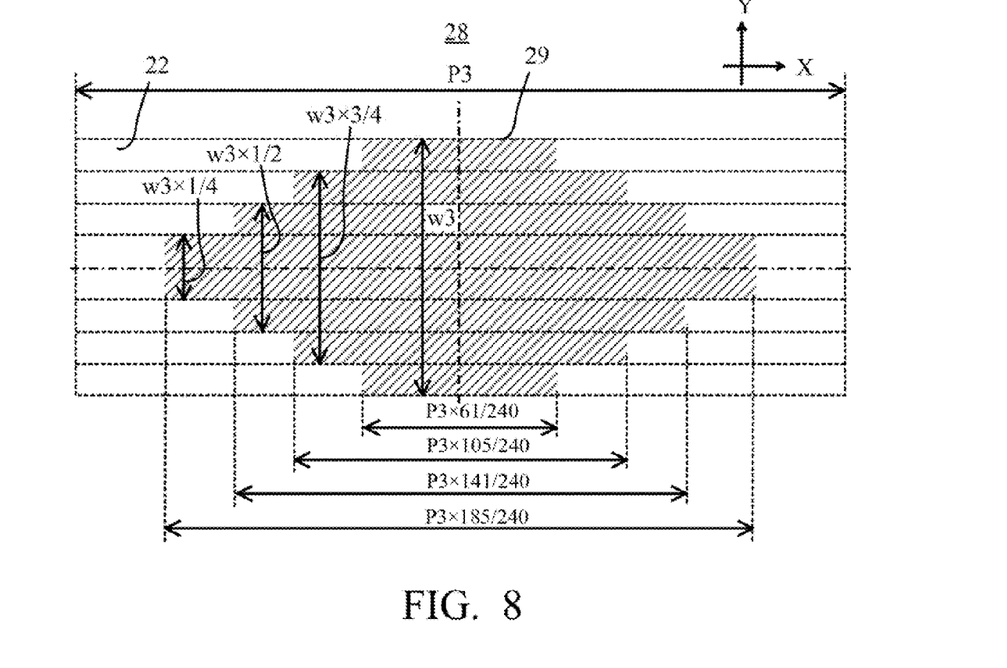
FIG. 8 is a partially enlarged plane view of FIG. 7 according to the second embodiment.

FIG. 8 is an enlarged plane view of the area 28 in the X direction for one period. The area 28 includes a pattern row in which the pattern illustrated in FIG. 8 is arranged every pitch P3 (=769.23077 μm) in the X direction. Each pattern includes a non-reflector 22 and a reflector 29 that is made of a reflective film and configured to reflect light. A width W3 of the area 28 in the Y direction is 50 μm.

A width of the reflector 29 in the X direction different according to a position of the area 28 in the Y direction. In an area distant by a distance of w3·1/8 or less from the center in the Y direction, the width of the reflector 29 is P3·185/240 in the X direction. In an area distant by a distance of w3·1/8 to w3·1/4 from the center in the Y direction, the width of the reflector 29 is P3·141/240 in the X direction. In an area distant by a distance of w3·1/4 to w3·3/8 from the center in the Y direction, the width of the reflector 29 is P3·105/240 in the X direction. In an area distant by a distance of w3·3/8 to w3·1/2 from the center in the Y direction, the width of the reflector 29 is P3·61/240 in the X direction.

Figure 9:
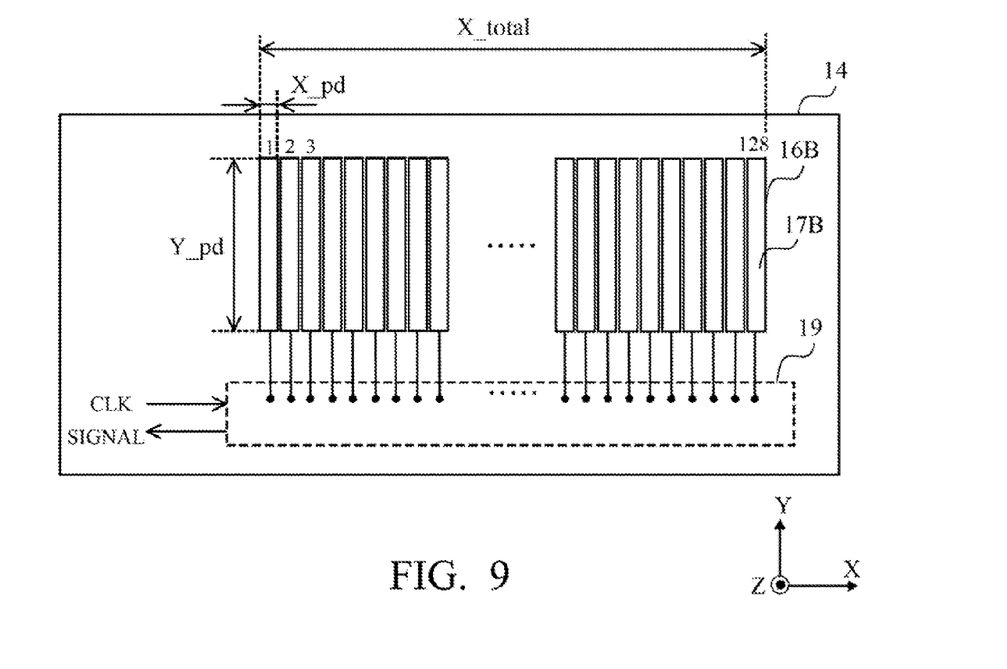
FIG. 9 is a plane view of a light receiving surface of a light receiving element array according to the second embodiment.

FIG. 9 is a plane view of the light receiving surface of the light receiving element array 16B according to the second embodiment applicable to the light receiving element array 16 illustrated in FIG. 1. The light receiving element array 16B is a so-called linear sensor array configured to sequentially take an output corresponding to a light receiving amount of each light receiving element 17B in synchronization with the clock timing.

In the light receiving element array 16B, 128 light receiving elements 17B are arranged with a pitch of 12.5 μm in the X direction: Its width Y_pd in the Y direction is 600 μm, and its overall width X_total is 1,600 μm in the X direction.

Since the projected pattern on the scale is magnified twice, the detectable range on the scale is 300 μm in the Y direction and 800 μm in the X direction. Hence, the detectable range on the scale contains two lines in the Y direction, and each line includes the areas 23, 25 and 28.

A method for separating each periodical signal component of each of the areas 23, 25, and 28 from a linear image signal V output from an output unit 19 of the light receiving element array 16B may employ a Fourier transform or a conversion into four-phase sine waves corresponding to each period, as in the first embodiment.

Φ1 is a phase of a signal corresponding to the area 23 (with a period of 99.50249 μm). Φ2 is a phase of a signal corresponding to the area 25 (with a period of 200 μm). Φ3 is a phase of a signal corresponding to the area 28 (with a period of 769.23077 μm). Initial phases of the three periods on the scale 20 are set so that Φ1=Φ2=Φ3=0 is satisfied at one end (X=0 mm) of the moving range.

Next, phase signals Φa and Φb are obtained as follows by setting Sv to Φa, 2 to m, and 1 to n in Expression 22:

$$\Phi a = \Phi 1 - 2 \cdot \Phi 2 \qquad \text{Expression 27}$$

$$\Phi b = 4 \cdot \Phi 3 - \Phi 2 \qquad \text{Expression 28}$$

At this time, by repeating Φa=Φa+2π when Φa<0 and Φa=Φa−2π when Φa>2π, Φa is converted into an output range between 0 and 2π. This is true of Φb.

Figure 10A:
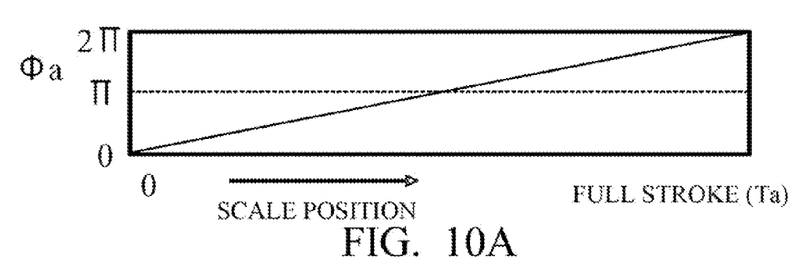
FIGS. 10A and 10B illustrate a relationship between a detected signal and a scale position according to the second embodiment.
Figure 10B:
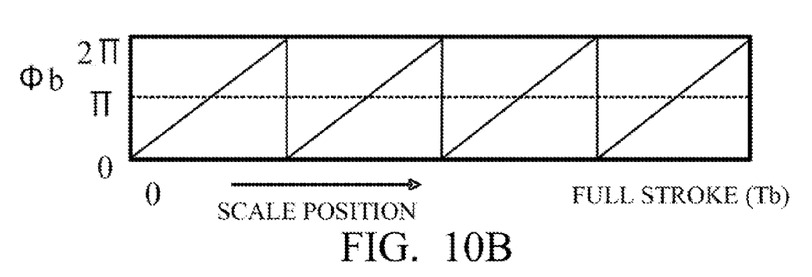

From Expression 24, the signal periods Ta and Tb for Φa and Φb in the X direction are Ta=20,000 [μm] and Tb=5,000 [μm]. FIG. 10A illustrates a relationship between Φa and the scale position. FIG. 10B illustrates a relationship between Φb and the scale position.

Coefficients in Expression 28 are set so as to obtain Tb=5,000 [μm] as a detection stroke. Although the coefficients may be arbitrarily set, it is necessary for a long detecting stroke to reduce a denominator in Tb=|P2·P3/(m×P2−n×P3)| in Expression 24. The above stroke becomes detectable by setting m to 4 and n to 1 from P2=200 μm and P3=769.23077 μm.

A description will now be given of processing to obtain information of an absolute position using the positional information acquirer 34 in the signal processor 30. Initially, the signal processor 30 obtains a superordinate signal C corresponding to the above signal Sv as the phase signal Φa and the detectable full stroke is Ta=20,000 [μm].

Next, the signal processor 30 synchronizes the superordinate signal C with Φb, calculates, based on the superordinate signal C, which period of Φb the current position corresponds to, and obtains a position signal (medium signal M expressed by the following expression) having positional accuracy of Φb by connecting Φb.

$$M = (2\pi \cdot \text{ROUND}[((Ta/Tb \cdot C - \Phi b)/(2\pi)] + \Phi b) \cdot Tb/Ta \qquad \text{Expression 29}$$

Herein, ROUND[x] is a function that converts a value into an integer closest to x.

Next, the signal processor 30 synchronizes the medium signal M with Φ3, calculates which period of Φ3 the current position is located at, using the medium signal M, and obtains a position signal (subordinate signal F expressed in the following expression) having the positional accuracy of Φ3 by connecting Φ3.

$$F=(2\pi \cdot \text{ROUND}[((Ta/P3 \cdot M-\Phi 3)/(2\pi)]+\Phi 3) \cdot P3/Ta \quad \text{Expression 30}$$

Next, the signal processor 30 synchronizes the subordinate signal F with Φ1, calculates which period of Φ1 the current position is located at, using the subordinate signal F, and obtains an absolute position signal ABS having the positional accuracy of Φ1 by connecting Φ1.

$$ABS=(\text{ROUND}[((Ta/P1 \cdot F-\Phi 1)/(2\pi)]+\Phi 1/(2\pi)) \cdot P1 \; [\mu m] \quad \text{Expression 31}$$

As discussed, information of the absolute position of the long stroke is obtained using a highly precise incremental pattern signal. In addition, as illustrated in Expressions 27 and 28, a component of Φ2 with the same sign is contained. This configuration can reduce a relative phase error between Φa and Φb and avoid an error in the synthesizing processing.

This embodiment generates the absolute position signal ABS having positional precision of Φ1 as the relative position signal, and requires no relative position signal. Of course, the absolute position signal ABS may be generated even in the first embodiment. This embodiment can more precisely obtain an absolute position signal than the first embodiment.

Third Embodiment

Figure 11:
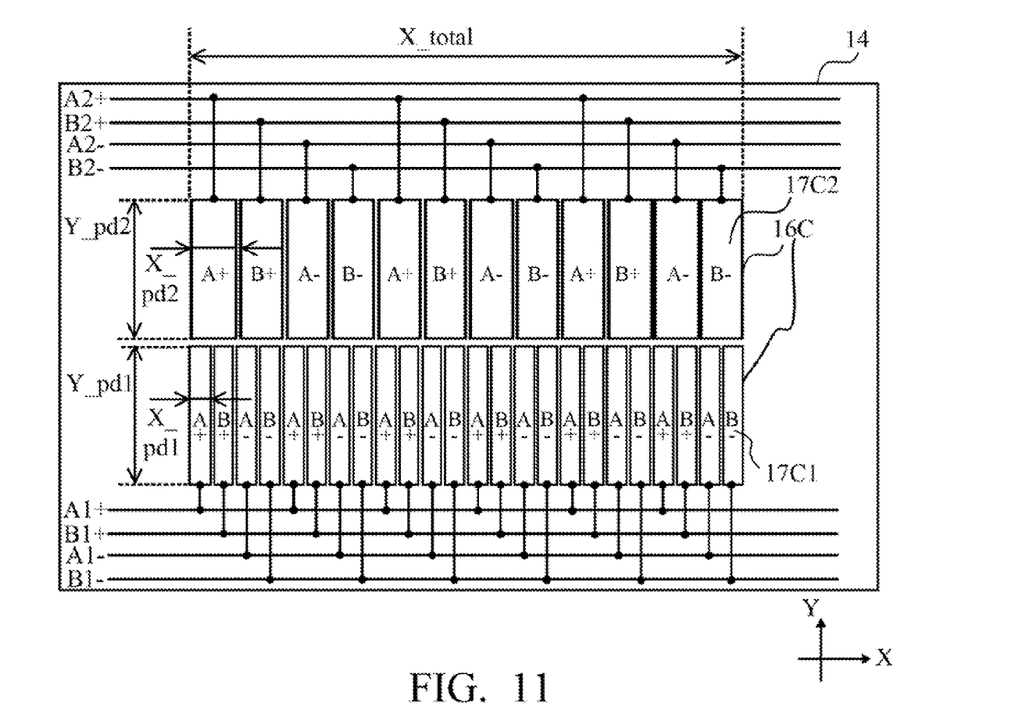
FIG. 11 is a plane view of a light receiving surface of a light receiving element array according to the third embodiment.

The structure of the encoder and the pattern of the scale 20 in the third embodiment are similar to those in the first embodiment. FIG. 11 is a plane view that illustrates a light receiving surface of a light receiving element array 16C according to the third embodiment applicable to the light receiving element array 16 illustrated in FIG. 1.

The light receiving element array 16C is divided into two groups in the Y direction, and each row has a different pitch and the different number of elements.

In the first row on the lower side in FIG. 11, twenty-four light receiving elements 17C1 each serving as a first detector is arranged with a pitch of 50 μm in the X direction. Each light receiving element 17C1 has a width X_pd1 of 50 μm in the X direction, and a width Y_pd1 of 800 μm in the Y direction. An overall width X_total is 1,200 μm. Since the projected pattern on the scale is magnified twice, the detectable range on the scale is 400 μm in the Y direction and 600 μm in the X direction. Hence, the detectable range on the scale contains four lines in the Y direction, and each line includes the area 23 with a pitch of 100 μm in the position detecting direction, and the area 25 with a pitch of 202 μm. Electrically connected light receiving elements 17C1 has a central interval of 200 μm, and can detect the area 23 (P1=100 μm).

In the second row on the upper side in FIG. 11, twelve light receiving elements 17C2 each serving as a second detector is arranged with a pitch of 100 μm in the X direction. Each light receiving element 17C2 has a width X_pd2 of 100 μm in the X direction, and a width Y_pd2 of 800 μm in the Y direction. An overall width X_total is 1,200 μm. Since the projected pattern on the scale is magnified twice, the detectable range on the scale is 400 μm in the Y direction and 600 μm in the X direction. Hence, the detectable range on the scale contains four lines in the Y direction, and each line includes the area 23 with a pitch of 100 μm in the position detecting direction, and the area 25 with a pitch of 202 μm. Electrically connected light receiving elements 17C2 has a central interval of 400 μm, and can detect the area 25 (P2=202 μm).

An output from the light receiving element in each row is connected to a different one of four preamplifiers (not illustrated). The signal processor 30 generates two-phase sine signals S(A1) and S(B1) in which a DC component is removed, by the following expressions with the four-phase sine signal S(A1+), S(B1+), S(A1−), and S(B1−) obtained from the light receiving elements 17C1 in the first row:

$$S(A1)=S(A1+)-S(A1-) \quad \text{Expression 32}$$

$$S(B1)=S(B1+)-S(B1-) \quad \text{Expression 33}$$

The signal processor 30 generates two-phase sine wave signals S(A2) and S(B2) in which a DC component is eliminated, by performing the following expressions for the four-phase sine wave outputs S(A2+), S(B2+), S(A2−), and S(B2−) obtained from the light receiving elements 17C2 in the second row.

$$S(A2)=S(A2+)-S(A2-) \quad \text{Expression 34}$$

$$S(B2)=S(B2+)-S(B2-) \quad \text{Expression 35}$$

Moreover, the signal processor 30 generates the phase signal Φ1 corresponding to P1 and the phase signal Φ2 corresponding to P2 using the following expressions:

$$\Phi 1=\text{ATAN2}[S(A1),S(B1)] \quad \text{Expression 36}$$

$$\Phi 2=\text{ATAN2}[S(A2),S(B2)] \quad \text{Expression 37}$$

The subsequent processing is similar to that of the first embodiment.

Figure 12:
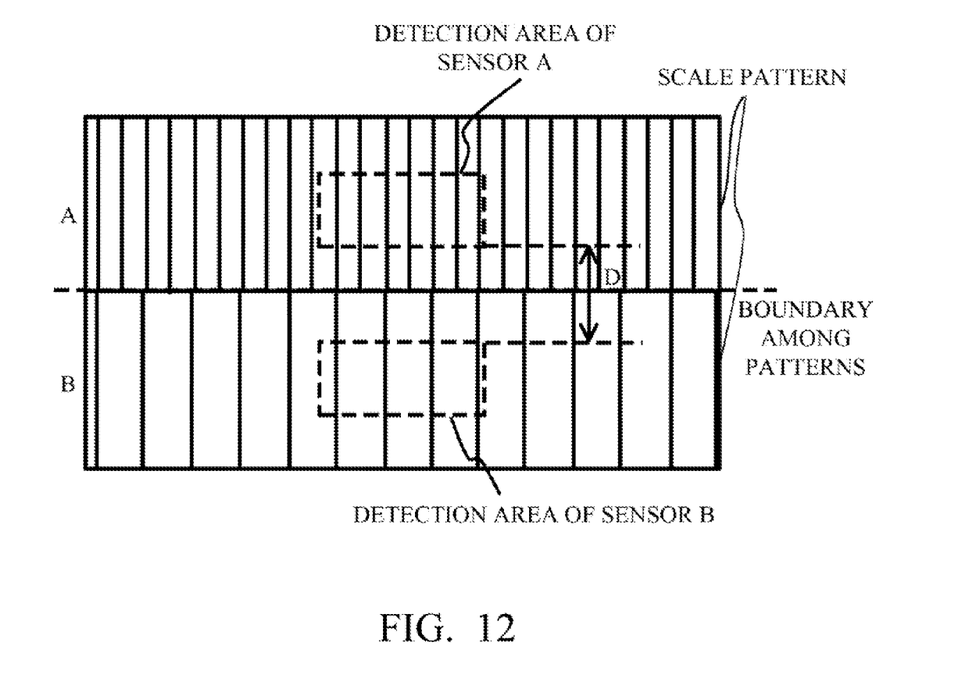
FIG. 12 illustrates a positional relationship between a patterned area and a reading area of a two-track detector according to the third embodiment.

A description will now be given of an advantage in simultaneous receiving of images from different periodic patterns for each light receiving element array 16C. FIG. 12 illustrates a reading area of each sensor and a position shiftable range in the Y direction when each light receiving element scans a separate periodic pattern.

In order to prevent the sensor reading area from projecting from the corresponding pattern, it is necessary to precisely set the relative position in the Y direction because the position shiftable range is limited to ±D/2 by the interval D of the reading area.

On the other hand, this embodiment simultaneously receives images from different periodic patterns and detectably separates only a necessary signal. Thus, the above limitation is not applied and a signal can be stably and precisely obtained.

As described above, this embodiment detects a different period with a separate light receiving element and thus requires no switching processing. Therefore, this embodiment is more effective than the first embodiment in a system that emphasizes the time synchronism between periodic signals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is not limited to the encoder of this embodiment, and is applicable to another apparatus incorporated with the encoder of the present invention, such as a lens apparatus, an image-pickup apparatus, a manufacturing apparatus, and an apparatus that contains a movable object or unit. The apparatus incorporated with the encoder may be referred to as a (position detecting) apparatus configured to detect a position. The apparatus incorporated with the encoder characteristically includes a movable unit that is movable relative to an apparatus body, and the encoder according to the present invention configured to detect a position of the movable unit (relative to the apparatus body). One illustrative example of the apparatus incorporated with the encoder is a lens apparatus that includes a zoom lens unit that is movable during zooming or a lens apparatus that includes a focusing lens unit that is movable during focusing. When the present invention is applied such a lens apparatus, the encoder of this embodiment can detect a position of the lens unit. Similarly, when the encoder of the present invention is applied to an apparatus, such as a facsimile machine, a printer, and a copier, configured to output or input a sheet of paper, the encoder of this embodiment can detect a position of the movable unit in the paper carrying system in the apparatus. When the encoder of the present invention is applied to a manufacturing apparatus used for a factory, such as a processing machine or a belt conveyor, the encoder of this embodiment can detect a position of a movable unit, such as a stage, a tool, or a belt in the manufacturing apparatus body. In the other apparatus that includes a movable object or unit, the encoder of this embodiment can detect a position of the movable object.

This application claims the benefit of Japanese Patent Application No. 2011-089745, filed Apr. 14, 2011, which is hereby incorporated by reference herein in its entirety.

What is claimed is:

1. An encoder comprising:
    a scale that includes a pattern row that has a plurality of patterns configured to spatially modulate an energy distribution;
    a detector array that includes a plurality of detectors that are configured to detect the energy distribution from the pattern row and arranged in a moving direction, the detector array being configured to move relatively to the scale; and
    a signal processor configured to process and convert into positional information, an output signal from the detector array,
    wherein the pattern row has a first modulation period and a second modulation period different from the first modulation period in the moving direction, and
    wherein the signal processor includes:
    a first phase acquirer configured to acquire a first phase of the first modulation period based on the output signal of the detector array;
    a second phase acquirer configured to acquire a second phase of the second modulation period based on the output signal from the detector array; and
    a positional information acquirer configured to acquire Sv as a position signal that represents a position of the scale in the moving direction,
    wherein Sv satisfies:

$Sv = A \cdot \Phi 1 - B \cdot \Phi 2$ where A and B are coefficients that satisfy A/B=n/m using integers m and n that satisfy:

$|(m \cdot P1 - n \cdot P2)| < |(P1 - P2)|$, where $\Phi 1$ is the first phase acquired by the first phase acquirer, $\Phi 2$ is the second phase acquired by the second phase acquirer, P1 is the first modulation period, and P2 is the second modulation period.

2. The encoder according to claim 1, wherein the pattern row includes a first area having the first modulation period in the moving direction, and a second area having the second modulation period different from the first modulation period in the moving direction, the first area and the second area being periodically arranged in a direction perpendicular to the moving direction.

3. The encoder according to claim 1, wherein at least part of the plurality of detectors is used for the first phase acquirer to acquire the first phase and for the second phase acquire to acquire the second phase.

4. The encoder according to claim 1, wherein the signal processor further includes a signal separator configured to separate the output signal from the detector array into a signal corresponding to each area of the pattern row.

5. The encoder according to claim 4, wherein the signal separator switches an electrically added interval of the plurality of detectors between an interval configured to acquire the first phase and an interval configured to acquire the second phase.

6. The encoder according to claim 4, wherein the signal separator performs a fast Fourier transform for the output signal from the detector array.

7. The encoder according to claim 1, wherein the signal processor generates a new position signal by synchronizing the position signal with the first phase acquired by the first phase acquirer, and obtains information of the position of the scale based on the new position signal.

8. The encoder according to claim 1, wherein the plurality of detectors includes:
    a plurality of first detectors configured to provide an output to the first phase acquirer; and
    a plurality of second detectors configured to provide an output to the second phase acquirer,
    wherein the first acquirer and the second acquirer simultaneously acquire outputs from the plurality of detectors.

9. A position detecting apparatus comprising:
    a movable unit; and
    an encoder configured to detect a position of the movable unit,
    wherein the encoder includes:
    a scale that includes a pattern row that has a plurality of patterns configured to spatially modulate an energy distribution;
    a detector array that includes a plurality of detectors that are configured to detect the energy distribution from the pattern row and arranged in a moving direction, the detector array being configured to move relatively to the scale; and
    a signal processor configured to process and convert into positional information, an output signal from the detector array,
    wherein the pattern row has a first modulation period and a second modulation period different from the first modulation period in the moving direction, and
    wherein the signal processor includes:
    a first phase acquirer configured to acquire a first phase of the first modulation period based on the output signal of the detector array;
    a second phase acquirer configured to acquire a second phase of the second modulation period based on the output signal from the detector array; and
    a positional information acquirer configured to acquire Sv as a position signal that represents a position of the scale in the moving direction,
    wherein Sv satisfies:

$Sv = A \cdot \Phi 1 - B \cdot \Phi 2$ where A and B are coefficients that satisfy A/B=n/m using integers m and n that satisfy:

$|(m \cdot P1 - n \cdot P2)| < |(P1 - P2)|$, where $\Phi 1$ is the first phase acquired by the first phase acquirer, $\Phi 2$ is the second phase acquired by the second phase acquirer, P1 is the first modulation period, and P2 is the second modulation period.

* * * * *